(12) United States Patent
Su et al.

(10) Patent No.: US 12,480,553 B2
(45) Date of Patent: Nov. 25, 2025

(54) SYSTEM AND METHOD FOR MONITORING WEAR OF BRAKING FRICTIONAL PAD OF MOTOR VEHICLE

(71) Applicant: Volvo Car Corporation, Gothenburg (SE)

(72) Inventors: Jiangliu Su, Shanghai (CN); Yongxing Jin, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 238 days.

(21) Appl. No.: 18/075,558

(22) Filed: Dec. 6, 2022

(65) Prior Publication Data
US 2023/0175568 A1 Jun. 8, 2023

(30) Foreign Application Priority Data
Dec. 7, 2021 (CN) .......................... 202111483596.1

(51) Int. Cl.
*F16D 66/02* (2006.01)
*B60T 8/88* (2006.01)
(Continued)

(52) U.S. Cl.
CPC ............ *F16D 66/024* (2013.01); *B60T 8/885* (2013.01); *B60T 17/22* (2013.01); *B60T 17/221* (2013.01); *B60T 17/228* (2013.01); *G01L 5/28* (2013.01)

(58) Field of Classification Search
CPC ...... F16D 66/024; B60T 17/221; B60T 8/885; B60T 1/22; B60T 1/228; G01L 5/28
(Continued)

(56) References Cited

U.S. PATENT DOCUMENTS 11,970,150 B2 * 4/2024 Namgung ............ B60W 10/182
2018/0031065 A1 * 2/2018 Shabbir ................. F16D 66/026
(Continued)

FOREIGN PATENT DOCUMENTS

CN 216185086 U * 4/2022 ............ B60T 17/225
DE 102016218022 A1 3/2018
(Continued)

OTHER PUBLICATIONS

Apr. 26, 2023 European Search Report issued in Corresponding EP Application No. 22211693.

*Primary Examiner* — Stephanie E Bloss
*Assistant Examiner* — Kevin C Butler
(74) *Attorney, Agent, or Firm* — Clements Bernard Walker; Christopher L. Bernard

(57) ABSTRACT

A method and a system for monitoring wear of a braking frictional pad of a vehicle including a hydraulic brake device acting on a wheel thereof, the hydraulic brake device having a brake disc rotatable with the wheel and a braking frictional pad configured to be non-rotatable relative to the wheel and be linearly movable parallel to a rotational axis of the wheel, the system including: a record module configured to record a time required by the hydraulic brake device for establishing a brake hydraulic pressure when the vehicle is parked; and an electrical control unit in data communication with the record module and configured to compare the time required for establishing the brake hydraulic pressure with a time required by the same hydraulic brake device for establishing the brake hydraulic pressure and recorded when the braking frictional pad is brand new, so as to determine the wear state of the braking frictional pad.

20 Claims, 8 Drawing Sheets

(51) Int. Cl.
*B60T 17/22* (2006.01)
*G01L 5/28* (2006.01)

(58) Field of Classification Search
USPC .......................................................... 73/121
See application file for complete search history.

(56) References Cited

U.S. PATENT DOCUMENTS

2021/0284116 A1* 9/2021 Ikuma ................... F16D 55/226
2022/0373051 A1* 11/2022 Jin ......................... F16D 66/023
2023/0175568 A1* 6/2023 Su ............................ B60T 17/22
                                                                      340/454

FOREIGN PATENT DOCUMENTS

| JP | 2012127418 A | * | 7/2012 | |
|---|---|---|---|---|
| JP | 5636937 B2 | * | 12/2014 | |
| JP | 6418097 B2 | * | 11/2018 | .............. B60T 13/74 |
| WO | WO-2017022584 A1 | * | 2/2017 | .............. B60T 13/74 |

* cited by examiner

SYSTEM AND METHOD FOR MONITORING WEAR OF BRAKING FRICTIONAL PAD OF MOTOR VEHICLE

CROSS-REFERENCE TO RELATED APPLICATION

The present disclosure claims the benefit of priority of co-pending Chinese Patent Application No. 202111483596.1, filed on Dec. 7, 2021, and entitled "SYSTEM AND METHOD FOR MONITORING WEAR OF BRAKING FRICTIONAL PAD OF MOTOR VEHICLE," the contents of which are incorporated in full by reference herein.

TECHNICAL FIELD

The present disclosure generally relates to a system and a method for monitoring wear of a braking frictional pad of a motor vehicle.

BACKGROUND

Brake devices are mandatory for motor vehicles under traffic laws and regulations. A brake device generally includes a brake disc installed such that it can be rotated together with a vehicle wheel's wheel rim and a braking frictional pad (which may be also referred to as a braking frictional plate) installed non-rotatably relative to the vehicle rim. For example, each brake disc can be equipped with two braking frictional pads which can be installed on opposing sides of the respective brake disc with gaps therebetween respectively. The two braking frictional pads can be moved by a drive mechanism to contact the rotating brake disc, so as to clamp the brake disc. In this way, the brake disc can be stopped due to friction braking.

Usually, the brake disc is harder than the braking frictional pads. Therefore, the braking frictional pad can be worn and thus have a thinned thickness due to long-term braking. In order to generate sufficient friction braking, it is required to replace the old braking frictional pad, after its thickness is less than a given value, with a new one in time. Therefore, it is necessary to monitor the braking frictional pad's wear state.

A conventional method for monitoring the wear of a braking frictional pad includes providing a metal sheet on a backing plate of the braking frictional pad. This metal plate is configured to have a free end adjacent to a wear surface (i.e., a surface contacting the brake disc) of the braking frictional pad. Moreover, the free end is spaced from the wear surface by a given distance along a thickness direction of the brake disc. Normally, the free end of the metal plate is not in contact with the brake disc when the braking frictional pad contacts the brake disc to generate friction braking. However, after the braking frictional pad is thinned to a given extent, the free end of the metal plate will be in contact with the rotating brake disc and thus a harsh sound will be generated during the friction braking. Therefore, a driver is alerted that the braking frictional pad shall be replaced with a new one. This conventional method for monitoring the wear surface of the braking frictional pad is disadvantageous in that the driver cannot know the wear state of the braking frictional pad before the harsh sound is generated. Furthermore, contact of the metal sheet with the rotating brake disc can also damage the brake disc.

Another conventional method for monitoring the wear state of a braking frictional pad includes providing the braking frictional pad with a resistance sensor. However, on one aspect, the existence of the resistance sensor will increase the complexity of the motor vehicle's suspension structure design and cable layout, and on the other aspect, it will result in higher component costs and higher design and assembling costs.

SUMMARY

In order to solve the aforementioned issues in prior art, the present disclosure proposes a new technical measure for monitoring wear of a braking frictional pad, by which the wear state of the braking frictional pad can be readily monitored without greatly increasing costs or modifying suspension structure design of an existing motor vehicle, so as to enhance safe driving of motor vehicles.

According to an aspect, the present disclosure proposes a system for monitoring wear of a braking frictional pad of a motor vehicle, the motor vehicle including a hydraulic brake device acting on a vehicle wheel thereof, the hydraulic brake device having a brake disc rotatable together with the vehicle wheel and a braking frictional pad configured to be non-rotatable relative to the vehicle wheel and be linearly movable parallel to a rotational axis of the vehicle wheel, the system including:

a record module configured to record a time required by the hydraulic brake device for establishing a brake hydraulic pressure when the motor vehicle is parked; and an electrical control unit in data communication with the record module and configured to compare the time required by the hydraulic brake device for establishing the brake hydraulic pressure with a time required by the same hydraulic brake device for establishing the brake hydraulic pressure and recorded when the braking frictional pad is a brand new one, so as to determine the wear state of the braking frictional pad.

In an embodiment, when the record module performs recording specific to the hydraulic brake device of one vehicle wheel of the motor vehicle, the electrical control unit generates instructions to prohibit operation of the hydraulic brake devices of the other vehicle wheels of the motor vehicle.

In an embodiment, the time required for establishing the brake hydraulic pressure and recorded by the record module is an average of time measured for the hydraulic brake device to establish the same brake hydraulic pressure.

In an embodiment, the time required by the same hydraulic brake device for establishing the brake hydraulic pressure and recorded when the braking frictional pad is the brand new one is an average of time measured for the hydraulic brake device to establish the same brake hydraulic pressure.

In an embodiment, the record module is configured to operate, after certain mileage of driving of the motor vehicle and when the motor vehicle being parked, so as to record the time required by the hydraulic brake device for establishing the brake hydraulic pressure.

In an embodiment, the motor vehicle includes a brake fluid loop and a brake fluid tank in fluid communication with the brake fluid loop, the brake fluid loop includes a hydraulic main pump and a fluid pipe network, and the fluid pipe network includes a hydraulic loop part configured to enable one hydraulic brake device to be in fluid communication with the hydraulic main pump only when it is required to record a time required by said one hydraulic brake device for establishing the brake hydraulic pressure.

In an embodiment, a pressure sensor is provided in the fluid pipe network to measure a pressure of the brake fluid in the hydraulic loop part, so as to determine whether the brake hydraulic pressure has been established.

According to another aspect, the present disclosure proposes a system for monitoring wear of a braking frictional pad of a motor vehicle, the motor vehicle including a hydraulic brake device acting on a vehicle wheel thereof, the hydraulic brake device having a brake disc rotatable together with the vehicle wheel and a braking frictional pad configured to be non-rotatable relative to the vehicle wheel and be linearly movable parallel to a rotational axis of the vehicle wheel, the braking frictional pad being drivable by a hydraulic brake cylinder assembly to move, the system including:
 a record module configured to record a volume of a brake fluid supplied into a cylinder body of the hydraulic brake cylinder assembly and required by the hydraulic brake device for establishing a brake hydraulic pressure when the motor vehicle is parked; and
 an electrical control unit in data communication with the record module and configured to compare the volume of the brake fluid supplied in the cylinder body as recorded with a volume of the brake fluid supplied in the same cylinder body and required by the same hydraulic brake device for establishing the brake hydraulic pressure and recorded when the braking frictional pad is a brand new one, so as to determine the wear state of the braking frictional pad.

In an embodiment, when the record module performs recording of the hydraulic brake device of one vehicle wheel of the motor vehicle, the electrical control unit generates instructions to prohibit operation of the hydraulic brake devices of the other vehicle wheels of the motor vehicle.

According to another aspect, the present disclosure proposes a motor vehicle including a system for monitoring a braking frictional pad as mentioned above.

According to another aspect, the present disclosure proposes a method for monitoring a braking frictional pad of a motor vehicle, the motor vehicle including a hydraulic brake device acting on a vehicle wheel thereof, the hydraulic brake device having a brake disc rotatable together with the vehicle wheel and a braking frictional pad configured to be non-rotatable relative to the vehicle wheel and be linearly movable parallel to a rotational axis of the vehicle wheel, the method including:
 recording a time required by the hydraulic brake device for establishing a brake hydraulic pressure when the motor vehicle is parked; and
 comparing the time required for establishing the brake hydraulic pressure with a time required by the same hydraulic brake device for establishing the brake hydraulic pressure and recorded when the braking frictional pad is a brand new one, so as to determine the wear state of the braking frictional pad.

In an embodiment, operation of the hydraulic brake devices of the other vehicle wheels of the motor vehicle is prohibited when the record module performing recording specific to the hydraulic brake device of one vehicle wheel of the motor vehicle.

In an embodiment, the time required for establishing the brake hydraulic pressure and recorded by the record module is an average of time measured for the hydraulic brake device to establish the same brake hydraulic pressure.

In an embodiment, the time required by the same hydraulic brake device for establishing the brake hydraulic pressure and recorded when the braking frictional pad is the brand new one is an average of results recorded for the hydraulic brake device.

In an embodiment, recording the time required by the hydraulic brake device for establishing the brake hydraulic pressure is carried out after certain mileage of driving of the motor vehicle and when the motor vehicle being parked.

In an embodiment, the motor vehicle includes a brake fluid loop and a brake fluid tank in fluid communication with the brake fluid loop, the brake fluid loop includes a hydraulic main pump and a fluid pipe network, and the fluid pipe network includes a hydraulic loop part configured to enable one hydraulic brake device to be in fluid communication with the hydraulic main pump only when it is required to record a time required by said one hydraulic brake device for establishing the brake hydraulic pressure.

In an embodiment, a pressure sensor is provided in the fluid pipe network to measure a pressure of the brake fluid in the hydraulic loop part, so as to determine whether the brake hydraulic pressure has been established.

According to another aspect, the present disclosure proposes a method for monitoring wear of a braking frictional pad of a motor vehicle, the motor vehicle including a hydraulic brake device acting on a vehicle wheel thereof, the hydraulic brake device having a brake disc rotatable together with the vehicle wheel and a braking frictional pad configured to be non-rotatable relative to the vehicle wheel and be linearly movable parallel to a rotational axis of the vehicle wheel, the braking frictional pad being drivable by a hydraulic brake cylinder assembly to move, the system including:
 recording a volume of a brake fluid supplied into a cylinder body of the hydraulic brake cylinder assembly and required by the hydraulic brake device for establishing a brake hydraulic pressure when the motor vehicle is parked; and
 comparing the volume of the brake fluid supplied in the cylinder body as recorded with a volume of the brake fluid supplied in the same cylinder body and required by the same hydraulic brake device for establishing the brake hydraulic pressure and recorded when the braking frictional pad is a brand new one, so as to determine the wear state of the braking frictional pad.

In an embodiment, operation of the hydraulic brake devices of the other vehicle wheels of the motor vehicle is prohibited when the record module performing recording specific to the hydraulic brake device of one vehicle wheel of the motor vehicle.

According to another aspect, the present disclosure proposes a system for monitoring a braking frictional pad of a motor vehicle, including:
 an electrical control unit configured to control a hydraulic brake device of the motor vehicle and to operate a brake fluid drive loop of the hydraulic brake device, wherein the electrical control unit is configured to carry out a method mentioned above.

Using the technical measures provided in the present disclosure, the wear state of the braking frictional pad can be reliably monitored without adding extra apparatus to the braking frictional pad. Therefore, this provides a reliable indicator for the motor vehicle's user to replace the braking frictional pad and leads to lower costs of designing, manufacturing, and assembling the brake device, and thus safer driving of the motor vehicle.

BRIEF DESCRIPTION OF THE DRAWINGS

The principles and other aspects of the present disclosure will be explained in the following description with reference to the attached drawings, in which.

DETAILED DESCRIPTION OF EMBODIMENTS

Figure 1:
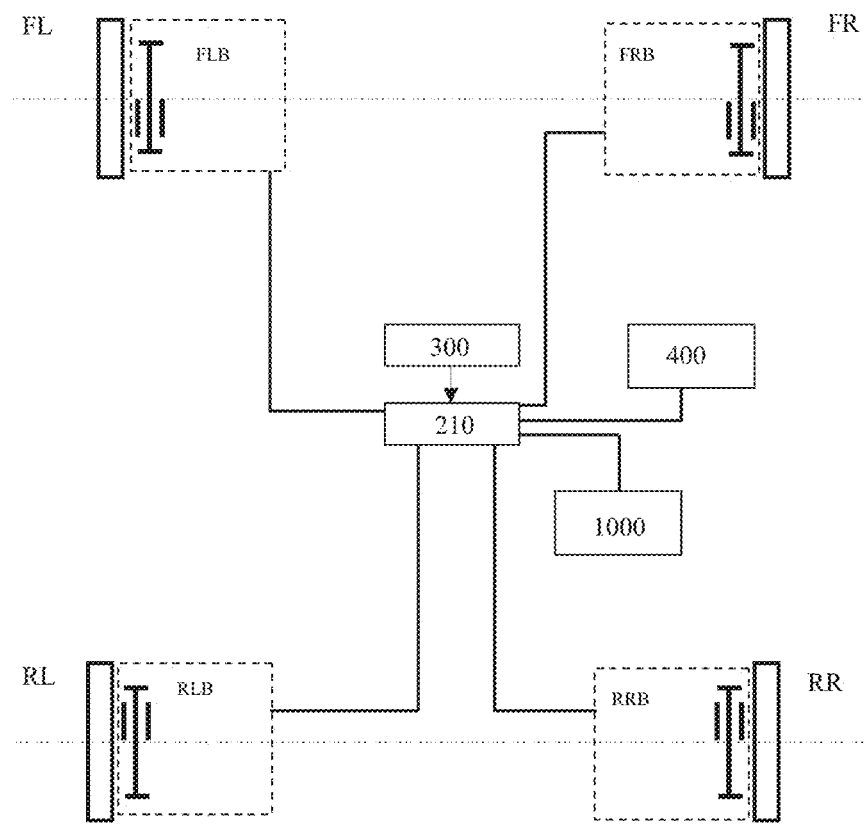
FIG. 1 is a schematic block diagram illustrating a motor vehicle which is equipped with a hydraulic brake system.

In the drawings of the present disclosure, the features having the same configuration or same functions are represented by the same reference numerals respectively.

FIG. 1 is a schematic diagram illustrating a motor vehicle 100 provided with four vehicle wheels, i.e., a front left wheel FL, a front right wheel FR, a rear left wheel RL, and a rear right wheel RR. Each of the vehicle wheels is equipped with a hydraulic brake device FLB, FRB, RLB or RRB respectively. Those hydraulic brake devices can be as part of a hydraulic brake system of the motor vehicle 100. For instance, the hydraulic brake system can also include a brake fluid tank 300 and a brake fluid drive loop 210 in fluid communication with the brake fluid tank 300. The brake fluid drive loop 210 is configured to be in fluid communication with each of the hydraulic brake devices FLB, FRB, RLB and RRB so as to drive them to perform braking actions respectively.

Figure 2:
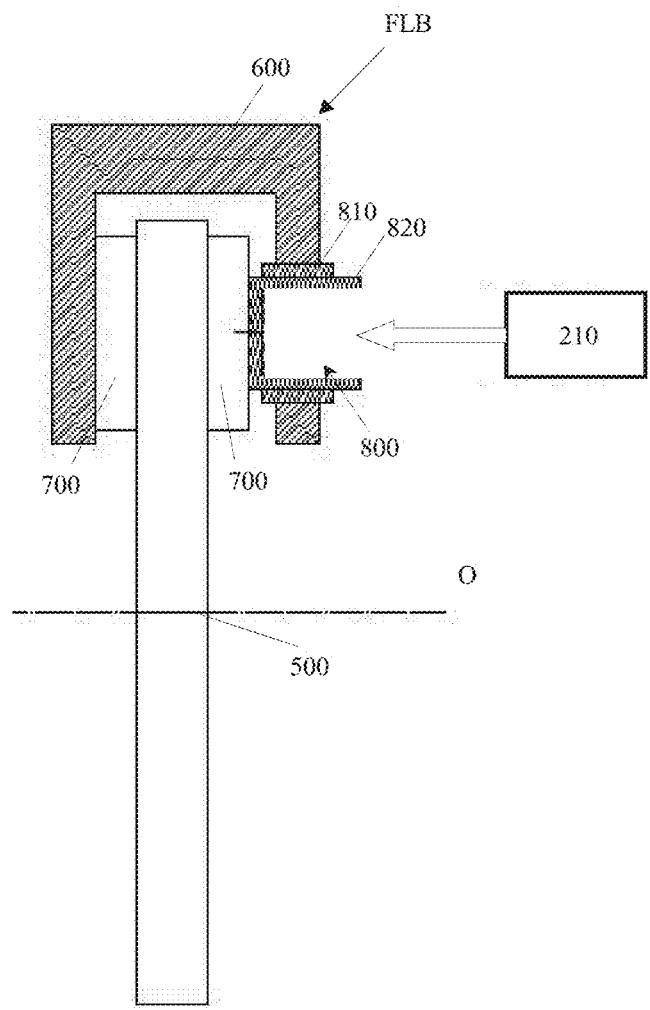
FIG. 2 is a schematic diagram illustrating a hydraulic brake device equipped for one vehicle wheel.

FIG. 2 is a schematic diagram simply illustrating the hydraulic brake device FLB, for example. It is understood by a person skilled in the art that the other hydraulic brake devices FRB, RLB and RRB are configured and/or operated in a manner similar to as shown by FIG. 2. The hydraulic brake device FLB includes a brake disc 500. The brake disc 500 is installed such that it is non-rotatable relative to the vehicle wheel FL and they have a common central rotation axis O. That is to say, when the vehicle wheel FL rotates, the brake disc 500 will be driven to rotate together with the vehicle wheel FL (FIG. 1) about the central rotation axis O. The hydraulic brake device FLB also includes a brake caliper 600. The brake caliper 600 is installed to a part of the motor vehicle's suspension (not shown) such that the brake caliper is non-rotatable relative to the vehicle wheel FL or the brake disc 500, and at least partially surrounds the brake disc 500. A pair of braking frictional pads 700 are installed relative to the brake caliper 600 at axially opposing sides of the brake disc 500 respectively. Furthermore, a hydraulic brake cylinder assembly 800 is fixedly installed on the caliper 600. For instance, the hydraulic brake cylinder assembly 800 includes a cylinder body 810 fixedly installed relative to the caliper 600 and a brake piston 820 axially movable back and forth in the cylinder body 810. The brake piston 820 is configured to form an interaction relationship with one braking frictional pad 700 such that when the brake piston 820 is driven by a hydraulic force to push the braking frictional pad 700, the pair of the braking frictional pads 700 can be driven by the brake caliper 600 to move towards each other and contact the axially opposing sides of the brake disc 500 respectively. As the brake caliper 600 and the braking frictional pads 700 are all installed non-rotatably relative to the brake disc 500, the braking frictional pads 700 contacting the brake disc 500 will generate friction braking on the brake disc 500. As the hydraulic force of the brake piston 820 increases and reaches a given value, the brake disc 500 can be slowed down or finally stopped so as to perform braking of the vehicle wheel FL. When the braking of the vehicle wheel is not required, the hydraulic force is released from the brake piston 820 and the braking frictional pads 700 can be moved apart from the brake disc 500 such that the vehicle wheel FL will be able to freely rotate without friction braking. Because the hydraulic brake device FLB is in fluid communication with the brake fluid drive loop 210, the hydraulic force for driving the brake piston 820 is provided by the brake fluid drive loop 210.

Because a frictional material of the brake disc has a hardness less than a hardness of the brake disc 500 or its surface. Therefore, the frictional material of the braking frictional pad will be worn and have a thinned thickness due to long-term and frequent use of the motor vehicle. When the frictional material of the braking frictional pad is worn out, sufficient friction braking of the brake disc will not be provided when it is required to brake the vehicle wheel. Therefore, after a new braking frictional pad is installed for the motor vehicle, it is necessary to detect at all time the thickness of the braking frictional pad to know the wear state of the frictional material of the braking frictional pad.

Figure 3:
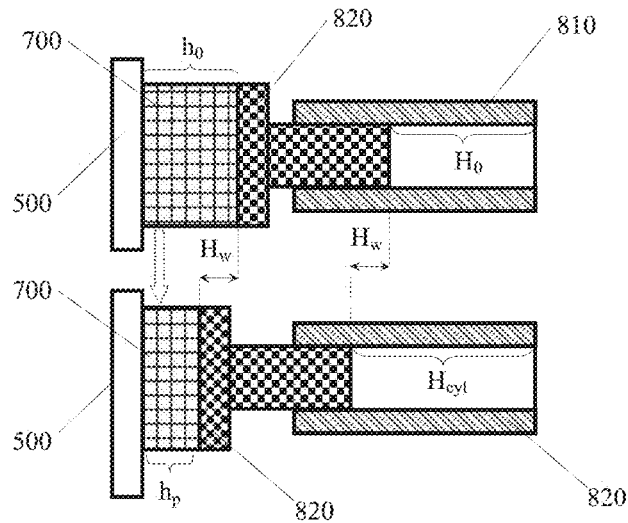
FIG. 3 is a schematic diagram illustrating the basic principle of detecting a thickness of a braking frictional pad of the hydraulic brake device according to the present application.

FIG. 3 is a schematic diagram illustrating how a brand new braking frictional pad interacts with a brake disc and how the braking frictional pad whose thickness has been thinned to a given extent interacts with the same brake disc. For clarity, only the braking frictional pad 700 at one side of the brake disc 500 is shown in FIG. 3, in which the upper braking frictional pad 700 represents a brand new braking frictional pad 700 and the lower represents the same braking frictional pad which has been worn to a given extent. FIG. 3 shows that different states of the upper brand new braking frictional pad 700 and the lower braking frictional pad 700 worn to the given extent when the same friction braking is applied to the brake disc 500. For instance, assuming that the hydraulic brake device FLB of one motor vehicle is equipped with a brand new braking frictional pad 700, the upper sub-view in FIG. 3 shows the state of this braking frictional pad 700 when exerting a brake force onto the brake disc 500; and the lower sub-view in FIG. 3 shows the state of this worn braking frictional pad 700 when exerting the same brake force onto the brake disc 500 after certain mileage (for example 50000 kilometers) of driving of the motor vehicle.

In case that the same brake force is exerted onto the brake disc 500 by the braking frictional pad 700, if volumetric deformation of the braking frictional pad 700 itself when being pressed is omitted, a thickness $h_0$ of the brand new braking frictional pad 700 and a thickness $h_p$ of the worn braking frictional pad 700 meet the relationship as below:

$$h_p = h_0 - H_w$$

wherein $H_w$ means the thickness loss of the braking frictional pad.

Figure 4:
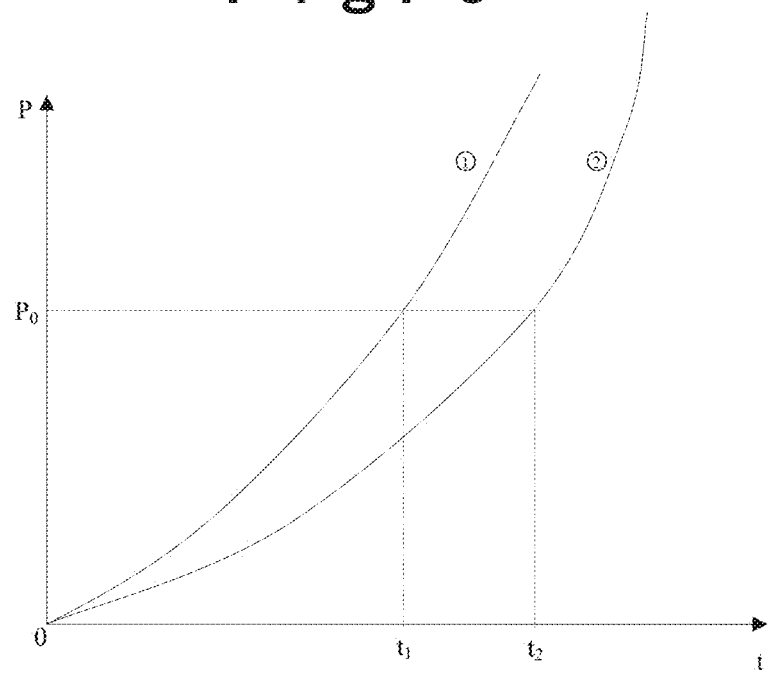
FIG. 4 is a schematic diagram illustrating a curve graph of the pressure changed over time, which pressure is exerted by a braking frictional pad when friction braking is implemented by a single hydraulic brake device.

Braking of the vehicle wheel has to undergo a process in which the hydraulic brake cylinder assembly 800 establishes a hydraulic brake force (i.e., the hydraulic force of the brake piston 820) and finally the hydraulic brake force meets the requirement for braking the vehicle wheel. During this process, as the braking frictional pad 700 is driven by the brake piston 820 to contact the brake disc 500, the hydraulic force provided by the brake piston 820 will increase gradually. Viewed from the brake fluid drive loop 210, the hydraulic pressure of the brake fluid in a hydraulic loop part connected to the brake piston 820 will increase gradually. FIG. 4 shows hydraulic pressure increasing processes of the brand new braking frictional pad 700 and the worn braking frictional pad 700, in which the curve 1 represents the hydraulic pressure increasing process of the brand new braking frictional pad 700 and the curve 1 represents the hydraulic pressure increasing process of the worn braking frictional pad 700 respectively.

Due to action of a restoring spring (not shown), the brake piston 820 will always be moved from the same fixed position measured in the cylinder body 810 each time when the vehicle wheel is braked. At the beginning of movement of the brake piston 820, the braking frictional pad 700 is driven by the brake piston 820, under action of the brake fluid pumped in the brake fluid drive loop 210, to move towards the brake disc 500. If the braking frictional pad 700 does not contact the brake disc 500, the hydraulic pressure in the corresponding hydraulic loop part is almost zero. From the moment at which the braking frictional pad 700 contacts the brake disc 500, the brake piston 820 cannot move again due to blocking of the braking frictional pad 700 and thus the hydraulic pressure in the corresponding hydraulic loop part will increase gradually with the strengthening of pumping. This correspondingly will increase the brake force exerted onto the brake disc 500 by the braking frictional pad 700. When the hydraulic pressure reaches a given value, the brake force exerted onto the brake disc 500 by the braking frictional pad 700 can be regarded to reach a desired value (for example, this desired value represents the braking intention (parking braking or deceleration braking) of the motor vehicle's driver without activating an anti-lock function of the motor vehicle). At this time, pumping the brake fluid can be stopped such that the hydraulic pressure can be kept steady and thus the braking of the brake disc 500 by the braking frictional pad 700 can be maintained. Therefore, in FIG. 4, spots of the curves at t=0 correspond to the moment at which the braking frictional pad 700 begins contacting the brake disc 500. In FIG. 4, in order that the hydraulic pressure can reach the same $P_0$ (for example, $P_0$=50 bar), the curve 1 requires a time $t_1$ and the curve 2 requires a time $t_2$ respectively, in which $t_1 < t_2$. This time difference between the two times appears to be caused by the thickness loss of the braking frictional pad 700. $P_0$ can represent the same brake force exerted onto the brake disc 500 when explaining FIG. 3.

Return to FIG. 3. It should be understood that the states of the upper braking frictional pad 700 and the lower braking frictional pad 700 are shown when the same brake force is exerted by them onto the brake disc 500 respectively. Apparently, due to the existence of the thickness loss $H_w$ of the braking frictional pad 700, the brake piston 820 will be at different axial positions in the cylinder body 810 when the same brake force is exerted.

With respect to the brand new braking frictional pad 700 (the upper one shown in FIG. 3), when the same brake force is exerted onto the brake disc 500, an axial distance of the brake piston 820 relative to a brake initial position in the cylinder body 810 (this brake initial position is a reference position which is fixed or unchanged for each hydraulic brake cylinder assembly 800) is $H_0$; with respect to the worn braking frictional pad 700 (the lower one shown in FIG. 3), when the same brake force is exerted onto the brake disc 500, an axial distance of the brake piston 820 relative to the brake initial position in the cylinder body 810 is $H_{cyl}$.

Because the axial size of the brake piston 820 can be regarded to be unchanged, the two axial positions of the brake piston 820 mentioned above shall meet the following relation:

$$H_{cyl} = H_0 + H_w$$

wherein $H_w$ is the thickness loss of the braking frictional pad 700. It should be understood that the $H_w$ reflects the difference between the brake fluid volume contained in the cylinder body 810 for the brand new braking frictional pad and the brake fluid volume contained in the cylinder body 810 for the worn braking frictional pad when the same brake force is exerted onto the brake disc 500 by the braking frictional pad.

Further as shown in FIG. 4, if the same brake force reflecting the $P_0$ shall be exerted onto the brake disc 500 as shown in FIG. 3, the volume of the brake fluid introduced into the cylinder body 810 (no matter whether for the brand new or worn braking frictional pad) shall be:

$$\Delta V = A \cdot Q \cdot t$$

wherein A is the cross-section of a valve opening of a fluid inlet valve (not shown) via which the hydraulic brake fluid can be supplied into the corresponding hydraulic loop part, Q is the brake fluid's flow rate (i.e. the volume of the brake fluid flowing through a unit area per a unit time, t is the time from the moment 0 as shown in FIG. 4 to the moment representing $P_0$.

If the cylinder body 810 is deemed to have a perfect cylinder inner wall, the cylinder body 810 will have an internal volume change $V = \frac{1}{4} \cdot \pi D^2 \cdot H$ when the brake piston 820 moves from the brake initial position to a position shown in FIG. 3, wherein D is an internal diameter of the cylinder body 810, H is an axial distance by which the brake piston 820 moves from the brake initial position to the position shown in FIG. 3.

With respect to the worn braking frictional pad 700, the H can be replaced with the $H_{cyl}$ such that $V = \frac{1}{4} \cdot \pi^2 \cdot H_{cyl}$, wherein D is the internal diameter of the cylinder body 810.

The brake fluid has a coefficient of compressibility $\beta = \Delta V / (p \cdot V)$, wherein p is the hydraulic pressure.

Therefore, the worn braking frictional pad 700 shall have a thickness:

$$h_p = H_0 + h_0 - (4AQ/\pi D^2 \cdot \beta \cdot p) \cdot t \qquad (1)$$

It can be seen that according to the equation (1), the actual thickness of the braking frictional pad after a period of use is relevant to the variant t. That is to say, if each hydraulic brake device associated with each vehicle wheel is controllable independently and the time required for establishing the same brake force when it will be exerted onto the brake discs can be measured, the actual thickness of the respective braking frictional pad can be determined. To say the least, even if the actual thickness of the respective braking frictional pad cannot be determined very precisely, the difference between the time required for establishing the same brake force via the brand new braking frictional pad when the same brake force will be exerted onto the brake discs and the time required for establishing the same brake force via the worn braking frictional pad when the same brake force will be exerted onto the brake discs can be used to estimate when it is necessary to replace the braking frictional pad with a new one. It should be understood by a person skilled in the art that as shown in FIG. 3, $h_p$ of the equation (1) refers to the thickness of the braking frictional pad 700 adjacent to the brake piston 820 of the hydraulic brake cylinder assembly 800. In the caliper 600, another braking frictional pad 700 is installed such that it is opposite to the braking frictional pad 700 (adjacent to the brake piston 820) in respect of the brake disc 500. Assume that the two braking frictional pads 700 will be worn identically. i.e., they have the same thickness loss. Therefore, $h_p$ of the equation (1) can also refer to the thickness of the other braking frictional pad 700.

Figure 5:
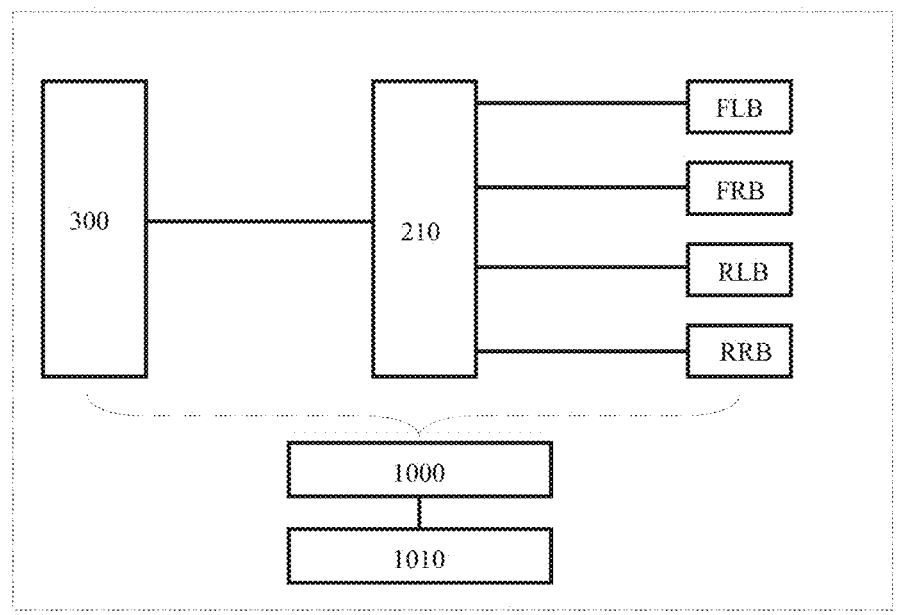
FIG. 5 is a block diagram illustrating a system for monitoring wear of a motor vehicle's braking frictional pad according to one embodiment of the present disclosure.

FIG. 5 is a schematic diagram illustrating a system for monitoring wear of a motor vehicle's braking frictional pad according to one embodiment of the present disclosure. As shown, the system for monitoring the wear of the motor vehicle's braking frictional pad generally includes an electrical control unit 1000 and the hydraulic brake system mentioned above. The hydraulic brake system includes the brake fluid tank 300, the brake fluid drive loop 210 in fluid communication with the brake fluid tank 300, and the hydraulic brake devices FLB, FRB, RLB and RRB in fluid communication with and driven by the brake fluid drive loop 210. In another embodiment, the system for monitoring the wear of the motor vehicle's braking frictional pad can include a record module 1010. For instance, the record module 1010 can be connected to the electrical control unit 1000. The record module 1010 can be configured to record the time required by the hydraulic brake device for establishing the brake hydraulic pressure, especially the time required by the hydraulic brake device for establishing the brake hydraulic pressure when the motor vehicle is parked. Therefore, the electrical control unit 1000 can be configured to compare the recorded time required for establishing the brake hydraulic pressure with a reference time required by the same hydraulic brake device for establishing the brake hydraulic pressure when the same hydraulic brake device was a brand new one, so as to determine the wear state of the braking frictional pad.

Further, the brake fluid drive loop 210 is also in fluid communication with a brake pedal 400. In the context of the present disclosure, the term "in fluid communication with" means that two features concerned are connected to each other such that a fluid can be conveyed therebetween; for example, the two features can be connected to each other directly or via pipeline(s) through which the fluid can be conveyed. The term "in data communication with" means that two features concerned can be connected to each other such that electrical data or signals can be conveyed therebetween; for example, the two features can be connected to each other via any suitable connector(s) such as cable(s). According to an action input from the brake pedal 400, the brake fluid drive loop 210 is configured to drive the hydraulic brake devices FLB, FRB, RLB and RRB to brake the vehicle wheels.

Figure 6:
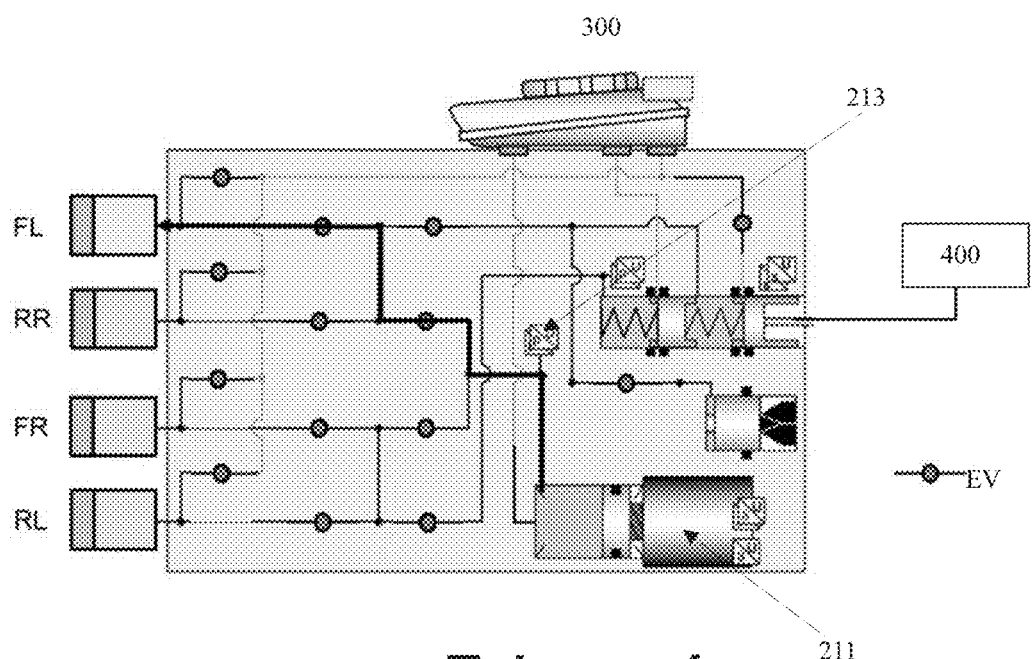
FIG. 6 is a schematic diagram illustrating a brake fluid drive loop of the hydraulic brake system according to one embodiment of the present disclosure.

The electrical control unit 1000 is configured to generate instructions or signals for independently controlling the brake fluid drive loop 210 to operate. FIG. 6 is a schematic diagram illustrating an example of the brake fluid drive loop 210. It should be understood by a person skilled in the art that this example of the brake fluid drive loop 210 is given for illustrative purposes only and cannot be deemed to restrict the scope of the present disclosure in any way. The brake fluid drive loop 210 according to the present disclosure is not limited to the configuration shown in FIG. 6. As shown, the brake fluid drive loop 210 generally includes a hydraulic main pump 211, a fluid pipe network and other relevant components. The fluid pipe network enables the hydraulic main pump 211 and a valve control device 212 to be in fluid communication with each other. In the meanwhile, the hydraulic brake devices FLB, FRB, RLB and RRB are also in fluid communication with the fluid pipe network.

Furthermore, the brake fluid tank 300 is also connected to the fluid network. In the context of the present disclosure, the term "operatively connected" means that when one of two features is connected to each other and operates, the other will also operate in a specified manner. Here, when the brake pedal 400 is pressed, the brake fluid in the brake fluid drive loop 210 will be enabled to flow correspondingly such that the hydraulic brake devices 1113. FRB, RLB and RRB are driven through the fluid pipe network to perform braking. Especially, several solenoid valves are provided at desired locations in the fluid pipe network, each of which solenoid valves is marked by a symbol "EV" in FIG. 6. The electrical control unit 1000 can be in data communication with the solenoid valves EV so as to control one or more of them to open or close as desired. Therefore, in the fluid pipe network of the brake fluid drive loop 210, a corresponding hydraulic loop part can be generated or defined by which hydraulic loop part only one of the hydraulic brake devices FLB, FRB, RLB and RRB can be in fluid communication with the hydraulic main pump 211.

Figure 7A:
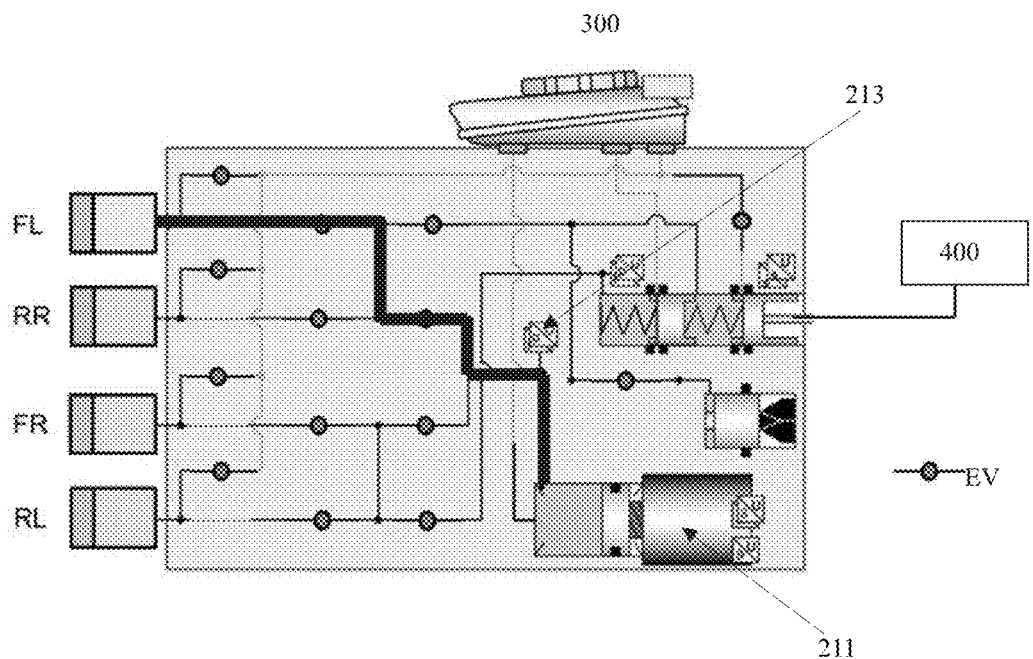
FIGS. 7A, 7B, 7C and 7D are schematic diagrams illustrating how a brake fluid is operated in the brake fluid drive loop when hydraulic brake devices of different vehicle wheels are required to perform actions respectively.
Figure 7B:
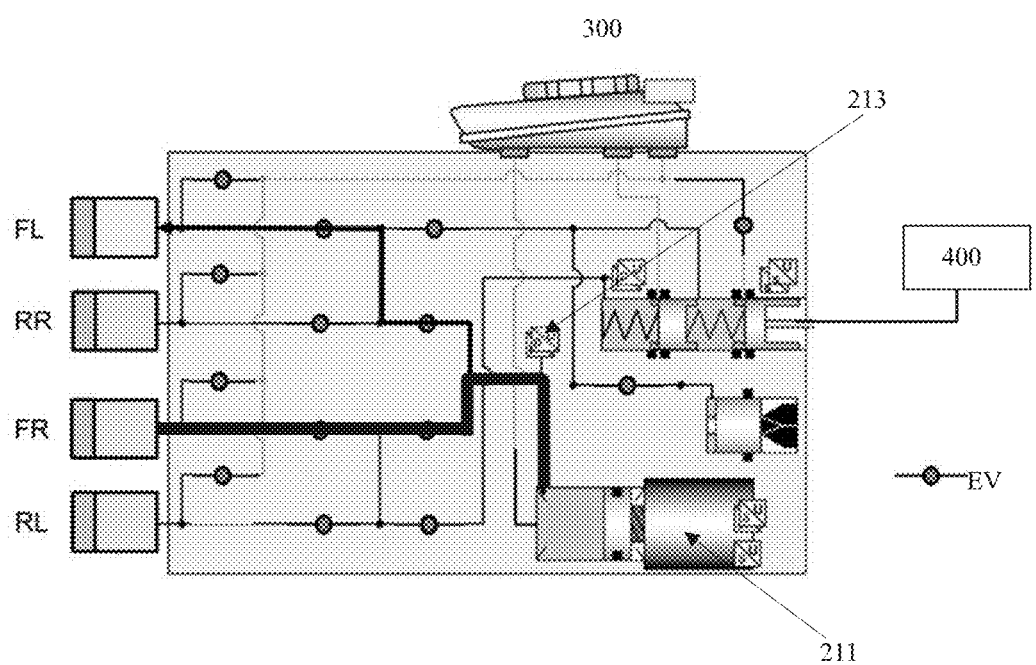
Figure 7C:
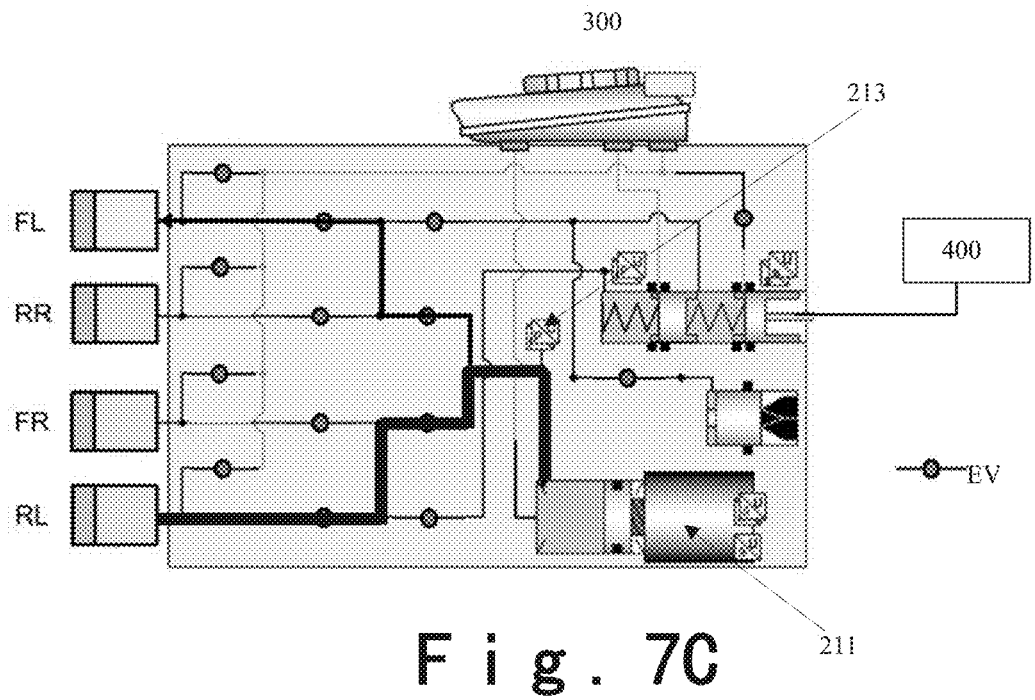
Figure 7D:
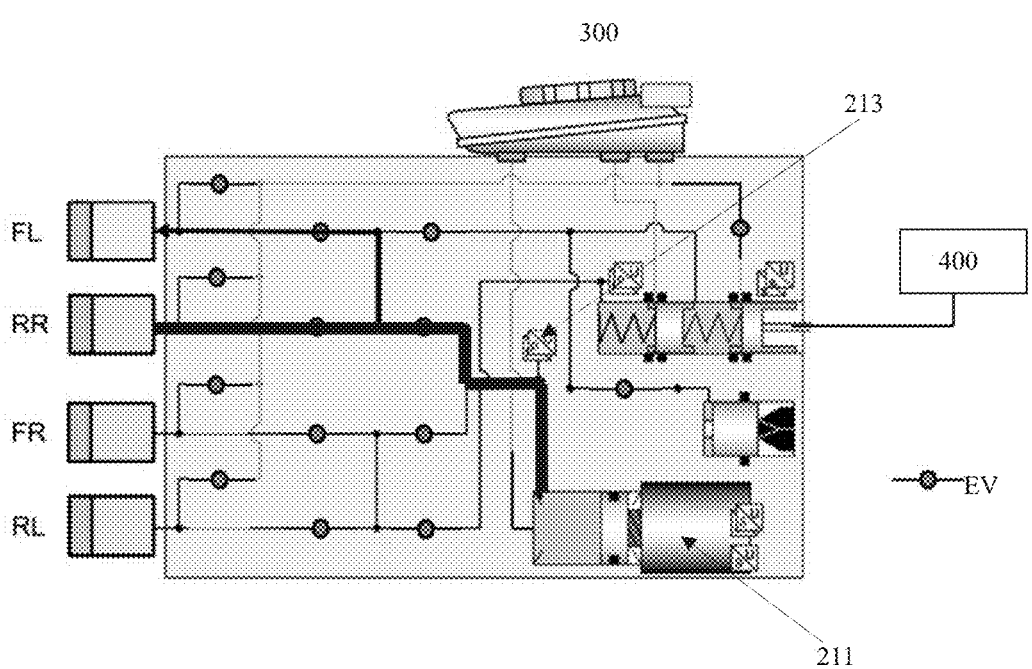

FIGS. 7A, 7B, 7C and 7D are schematic diagrams illustrating different hydraulic loop parts generated or defined in the fluid pipe network of the brake fluid drive loop 210, which hydraulic loop parts are configured to enable the hydraulic main pump 211 to be in fluid communication with only one of the hydraulic brake devices FLB, FRB, RLB and RRB respectively. FIG. 7A is a schematic diagram illustrating the hydraulic loop part enabling the hydraulic main pump 211 to be in fluid communication with the hydraulic brake device FLB. FIG. 7B is a schematic diagram illustrating the hydraulic loop part enabling the hydraulic main pump 211 to be in fluid communication with the hydraulic brake device FRB. FIG. 7C is a schematic diagram illustrating the hydraulic loop part enabling the hydraulic main pump 211 to be in fluid communication with the hydraulic brake device RLB. FIG. 7D is a schematic diagram illustrating the hydraulic loop part enabling the hydraulic main pump 211 to be in fluid communication with the hydraulic brake device RRB. In FIGS. 7A to 7D, bold lines refer to those hydraulic loop parts respectively. It can be seen that a pressure sensor 213 is provided in the fluid pipe network of the brake fluid drive loop 210. The pressure sensor 213 is configured to measure the hydraulic pressure in the hydraulic loop part whatever part of the already mentioned hydraulic loop parts it belongs to. In the meanwhile, the pressure sensor 213 is in data communication with the electrical control unit 1000 such that measured results can be transmitted to the electrical control unit 1000 and processed there.

Figure 8:
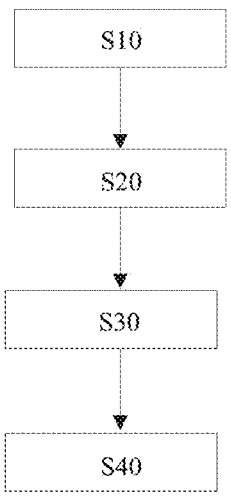
FIG. 8 is a flow chart illustrating a method for monitoring wear of a braking frictional pad according to one embodiment of the present disclosure.

FIG. 8 is a flow chart illustrating a method for monitoring wear of a braking frictional pad according to one embodiment of the present disclosure. It should be understood by a person skilled in the art that any methods or processes described here can be programmed as codes which can be executed in a computer. The codes can be stored in a memory of the electrical control unit 1000 such that, if necessary, they can be invoked by or executed in a computing unit of the electrical control unit 1000 or a driving computer.

As shown in FIG. 8, in step S10, it is first to determine whether a brand new braking frictional pad is installed in the motor vehicle. For example, this determination can be automatically carried out before a new motor vehicle leaves the factory. Alternatively, this determination can be carried out when a brand new braking frictional pad is manually installed in the motor vehicle after a period of use; for example, the determination can be carried out by a driver manually providing input to the electrical control unit 1000 via a display interface in the motor vehicle or a suitable input device. Furthermore, in step S10, a thickness of the brand new braking frictional pad can be automatically recorded when the motor vehicle leaves the factory. Alternatively, the thickness of the brand new braking frictional pad manually installed in the motor vehicle after a period of use can be manually inputted and recorded in the electrical control unit 1000.

In step S20, after the motor vehicle has been parked safely and securely, the fluid pipe network of the brake fluid drive loop 210 can be operated separately in any one of the manners as shown in FIGS. 7A, 7B, 7C and 7D such that a hydraulic loop part, though which the hydraulic main pump 211 is in fluid communication with only one of the hydraulic brake devices FLB, FRB, RLB and RRB, can be enabled. Then, a time required by each hydraulic brake device for establishing the brake hydraulic pressure can be recorded respectively. In the context of the present disclosure, the term "the time required for establishing the brake hydraulic pressure" refers to a time that has elapsed from a time point at which a braking frictional pad of a corresponding hydraulic brake device begins contacting the brake disc to a time point at which sufficient (or specified) friction braking (corresponding to the hydraulic pressure for driving the piston associated with the braking frictional pad) has been applied to the brake disc by the braking frictional pad. This time can be obtained by any existing measurement devices equipped in the motor vehicle. For example, "the time required for establishing the brake hydraulic pressure" is represented as $t_1$ and $t_2$ in FIG. 4.

In step S30, the current thickness (i.e., $h_p$) or the thickness loss of the braking frictional pad of the corresponding hydraulic brake device can be calculated out by the equation (1) using "the time required for establishing the brake hydraulic pressure" obtained in step S20. It should be understood by a person skilled in the art that steps S20 and S30 can be carried out after certain mileage (for example 5000-20000 kilometers) of driving of the motor vehicle so as to reduce computational burden of the electrical control unit 1000. Furthermore, in a technical solution of the present disclosure, the current thickness (i.e., $h_p$) or the thickness loss of the braking frictional pad of the hydraulic brake device can be obtained by carrying out steps S20 and S30 several times and calculating out an average of results. This can ensure that the calculated result has higher accuracy.

Then, in step S40, the current thickness (i.e., $h_p$) or the thickness loss of the braking frictional pad obtained in step S30 can be compared with the thickness of the brand new braking frictional pad recorded in step S10. If the difference between them exceeds a preset value, the respective braking frictional pad will have to be replaced with a new one. Furthermore, the driver can be alerted by an indicator in the displace interface of the motor vehicle and/or an alarm tone, that the braking frictional pad shall be replaced with a new one. In another embodiment, in step S40, it is determined whether the thickness loss of the braking frictional pad is greater than a preset value. If yes, the driver can be alerted by an indicator in the displace interface of the motor vehicle and/or an alarm tone, that the braking frictional pad shall be replaced with a new one.

Although in the already mentioned method embodiment the equation (1) is used to calculate out the current thickness (i.e. $h_p$) or the thickness loss of the braking frictional pad so as to determine the wear state of the braking frictional pad, it should be understood by a person skilled in the art that the difference between the time required by the brand new braking frictional pad for establishing a brake hydraulic pressure and the time required by the worn braking frictional pad for establishing the same brake hydraulic pressure can be directly used to determine whether it is required to replace the braking frictional pad with a new one.

Figure 9:
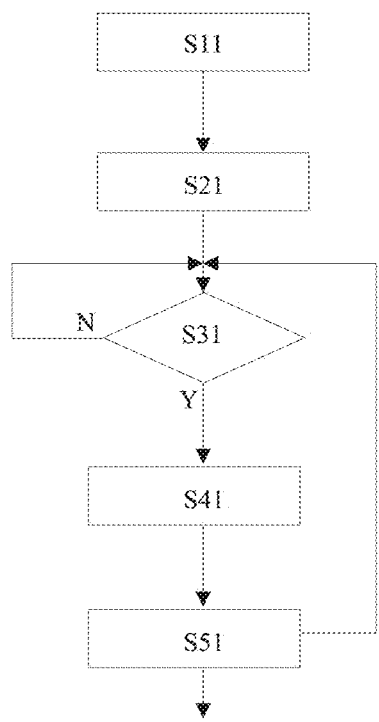
FIG. 9 is a flow chart illustrating a method for monitoring wear of a braking frictional pad according to another embodiment of the present disclosure.

FIG. 9 is a flow chart illustrating a method for monitoring wear of a braking frictional pad according to another embodiment of the present disclosure. In step S11, it is first to determine whether a brand new braking frictional pad is installed in the motor vehicle. For example, this determination can be carried out by a driver manually providing input to the electrical control unit 1000 via a display interface in the motor vehicle or a suitable input device.

In step S21, after it has been determined that the motor vehicle is equipped with the brand new braking frictional pad, a single one of the hydraulic brake devices FLB, FRB, RLB and RRB is enabled respectively to establish a hydraulic loop part in fluid communication with the hydraulic main pump 211 in the fluid pipe network of the brake fluid drive loop 210 in a manner similar to that is described with respect to step S20, and a time required by each hydraulic brake device for establishing the brake hydraulic pressure is recorded. Here, "the time required for establishing the brake hydraulic pressure" can be an average of results recorded after the motor vehicle has parked several times or a certain number of times, such that the time required for establishing the brake hydraulic pressure can be determined with higher accuracy.

In step S31, it is to determine whether the motor vehicle has been driven certain mileage; for example, whether the motor vehicle has been driven 5000-20000 kilometers after step S21. If the determination result in step S31 is no, the process continues to wait. If the determination result in step S31 is yes, the process goes to step S41. In step S31, the time required by each hydraulic brake device for establishing the brake hydraulic pressure is recorded in a manner similar to step S21. Here, the record mentioned in step S31 can be an average of results recorded after the motor vehicle has parked several times during a time period or within certain mileage (for example, 100-300 kilometers).

In step S41, a single one of the hydraulic brake devices FLB, FRB, RLB and RRB is enabled respectively to establish a hydraulic loop part in fluid communication with the hydraulic main pump 211 in the fluid pipe network of the brake fluid drive loop 210 in a manner similar to that is described with respect to step S20, and a time required by each hydraulic brake device for establishing the brake hydraulic pressure is recorded. Here, the record mentioned in step S41 can be an average of results recorded after the motor vehicle has parked several times during a time period or within certain mileage (for example, 100~300 kilometers).

In step S51, the time required for establishing the brake hydraulic pressure and recorded in step S21 is compared with the time required for establishing the brake hydraulic pressure and recorded in step S41. If the difference between them exceeds a preset value, the pair of braking frictional pads corresponding to the difference can be regarded to be worn excessively and need be replaced with new ones. Now, a driver can be alerted by an indicator in the displace interface of the motor vehicle and/or an alarm tone, that the braking frictional pads shall be replaced. If the comparing result in step S51 shows that the difference does not exceed the preset value, the process goes to step S31 so as to restart monitoring the braking frictional pads of the hydraulic brake devices FLB, FRB, RLB or RRB. For example, when the process goes to step S31 so as to restart the monitoring, the monitoring can be carried out after the motor vehicle has been driven 1000-2000 kilometers.

It should be understood by a person skilled in the art that the steps in the already mentioned method embodiments can be combined with each other, and they are given for illustrative purposes only and cannot be deemed to restrict the scope of the present disclosure in any way. Furthermore, it should be understood by a person skilled in the art that in the methods or processes mentioned above, after step S40 or S51, the fluid pipe network of the brake fluid drive loop 210 can be reset to factory status so as to ensure that the motor vehicle can be driven normally.

Figure 10A:
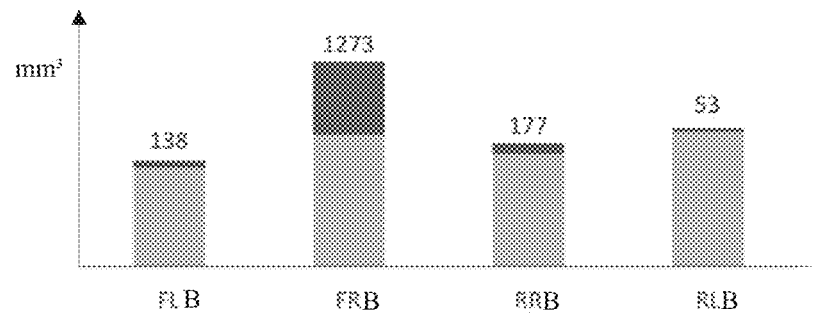
FIGS. 10A and 10B are diagrams of experimental results, those results being obtained by the system and the method for monitoring the wear of the motor vehicle's braking frictional pad according to the embodiments of the present disclosure.
Figure 10B:
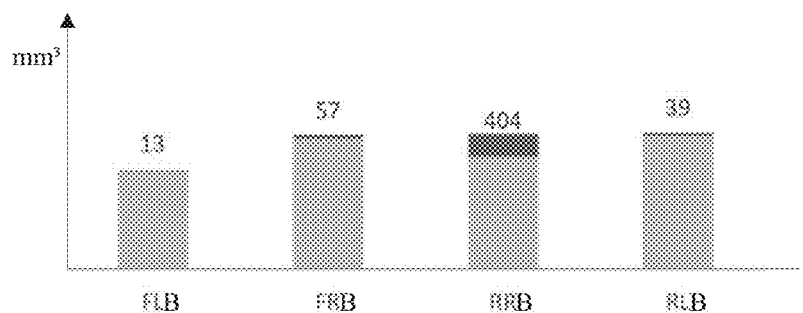

FIGS. 10A and 10B are diagrams of experimental results obtained by the system and the method for monitoring the wear of the motor vehicle's braking frictional pad according to the present disclosure, so as to explain the feasibility of the technical solutions of the present disclosure. Four columns in FIG. 10A or 10B represent the volumes of the brake fluid in the cylinder body 810 obtained using the equation mentioned above in case of the same $P_0$ (=50 bar) occurring. Especially, with respect to FIG. 10A, braking frictional pads of all hydraulic brake devices associated with four vehicle wheels are first replaced with brand new ones respectively; the volume of the brake fluid in the cylinder body 810 is determined when the same brake force is exerted onto a brake disc of each vehicle wheel; then, the braking frictional pads of the hydraulic brake device FRB are replaced with braking frictional pads having a thickness loss of 5 mm; and finally, the volume of the brake fluid in the cylinder body 810 is determined when the same brake force is exerted onto the brake disc of each vehicle wheel. Each column of FIG. 10A has a darked color part representing a volume difference value between the two determined volumes. The volume difference value is marked above the darked color part. With respect to FIG. 10B, braking frictional pads of all hydraulic brake devices associated with four vehicle wheels are first replaced with brand new ones respectively; the volume of the brake fluid in the cylinder body 810 is determined when the same brake force is exerted onto a brake disc of each vehicle wheel; then, the braking frictional pads of the hydraulic brake device RRB are replaced with braking frictional pads having a thickness loss of 5 mm; and finally, the volume of the brake fluid in the cylinder body 810 is determined when the same brake force is exerted onto the brake disc of each vehicle wheel. Each column of FIG. 10B has a darked color part representing a volume difference value between the two determined volumes.

It can be seen from FIGS. 10A and 10B that with respect to the hydraulic brake devices FRB, RRB equipped with the worn braking frictional pads, the volume difference values of the brake fluid are significant and sufficient to be distinguished. That is to say, the method and the system according to the present disclosure is reliable to monitor the braking frictional pads of the motor vehicle. It should be noted that in FIGS. 10A and 10B the volume difference of the brake fluid also exists in the hydraulic brake devices not equipped with the worn braking frictional pads. The volume difference is caused only by overlaps between the hydraulic loops established by the fluid pipe network, and does not affect the results of the system and the method according to the disclosure for monitoring the worn braking frictional pads.

Although some specific embodiments and/or examples of the present disclosure are described here, they are given for illustrative purposes only and cannot be deemed to restrict the scope of the present disclosure in any way. Furthermore, it should be understood by a person skilled in the art that the embodiments and/or examples described here can be combined. Without departing from the spirit and scope of the present disclosure, various replacements, modifications, and alternations can be carried out.

What is claimed is:

1. A system for monitoring wear of a braking frictional pad of a motor vehicle, the motor vehicle comprising a hydraulic brake device acting on a vehicle wheel thereof, the hydraulic brake device having a brake disc rotatable together with the vehicle wheel and a braking frictional pad configured to be non-rotatable relative to the vehicle wheel and be linearly movable parallel to a rotational axis of the vehicle wheel, the system comprising:
a record module configured to record a time required by the hydraulic brake device for establishing a brake hydraulic pressure when the motor vehicle is parked; and
an electrical control unit in data communication with the record module and configured to compare the time required by the hydraulic brake device for establishing the brake hydraulic pressure with a time required by the same hydraulic brake device for establishing the brake hydraulic pressure and recorded when the braking frictional pad is a brand new one, so as to determine the wear state of the braking frictional pad.

2. The system according to claim 1, wherein when the record module performs recording specific to the hydraulic brake device of one vehicle wheel of the motor vehicle, the electrical control unit generates instructions to prohibit operation of the hydraulic brake devices of the other vehicle wheels of the motor vehicle.

3. The system according to claim 2, wherein the time required for establishing the brake hydraulic pressure and recorded by the record module is an average of time measured for the hydraulic brake device to establish the same brake hydraulic pressure.

4. The system according to claim 3, wherein the time required by the same hydraulic brake device for establishing the brake hydraulic pressure and recorded when the braking frictional pad is the brand new one is an average of time measured for the hydraulic brake device to establish the same brake hydraulic pressure.

5. The system according to claim 2, wherein the record module is configured to operate, after certain mileage of driving of the motor vehicle and when the motor vehicle is parked, so as to record the time required by the hydraulic brake device for establishing the brake hydraulic pressure.

6. The system according to claim 2, wherein the motor vehicle comprises a brake fluid loop and a brake fluid tank in fluid communication with the brake fluid loop, the brake fluid loop comprises a hydraulic main pump and a fluid pipe network, and the fluid pipe network comprises a hydraulic loop part configured to enable one hydraulic brake device to be in fluid communication with the hydraulic main pump only when it is required to record the time required by said one hydraulic brake device for establishing the brake hydraulic pressure.

7. The system according to claim 6, wherein a pressure sensor is provided in the fluid pipe network to measure a pressure of the brake fluid in the hydraulic loop part, so as to determine whether the brake hydraulic pressure has been established.

8. The system according to claim 1, wherein the time required for establishing the brake hydraulic pressure and recorded by the record module is an average of time measured for the hydraulic brake device to establish the same brake hydraulic pressure.

9. The system according to claim 8, wherein the time required by the same hydraulic brake device for establishing the brake hydraulic pressure and recorded when the braking frictional pad is the brand new one is an average of time measured for the hydraulic brake device to establish the same brake hydraulic pressure.

10. The system according to claim 1, wherein the record module is configured to operate, after certain mileage of driving of the motor vehicle and when the motor vehicle is parked, so as to record the time required by the hydraulic brake device for establishing the same brake hydraulic pressure.

11. The system according to claim 1, wherein the motor vehicle comprises a brake fluid loop and a brake fluid tank in fluid communication with the brake fluid loop, the brake fluid loop comprises a hydraulic main pump and a fluid pipe network, and the fluid pipe network comprises a hydraulic loop part configured to enable one hydraulic brake device to be in fluid communication with the hydraulic main pump only when it is required to record the time required by said one hydraulic brake device for establishing the brake hydraulic pressure.

12. The system according to claim 11, wherein a pressure sensor is provided in the fluid pipe network to measure a pressure of the brake fluid in the hydraulic loop part, so as to determine whether the brake hydraulic pressure has been established.

13. A motor vehicle comprising a system for monitoring a braking frictional pad according to claim 1.

14. The motor vehicle according to claim 13, wherein when a record module of the system performs recording specific to the hydraulic brake device of one vehicle wheel of the motor vehicle, an electrical control unit of the system generates instructions to prohibit operation of the hydraulic brake devices of the other vehicle wheels of the motor vehicle.

15. A method for monitoring a braking frictional pad of a motor vehicle, the motor vehicle comprising a hydraulic brake device acting on a vehicle wheel thereof, the hydraulic brake device having a brake disc rotatable together with the vehicle wheel and a braking frictional pad configured to be non-rotatable relative to the vehicle wheel and be linearly movable parallel to a rotational axis of the vehicle wheel, the method comprising:
recording a time required by the hydraulic brake device for establishing a brake hydraulic pressure when the motor vehicle is parked; and
comparing the time required for establishing the brake hydraulic pressure with a time required by the same hydraulic brake device for establishing the brake hydraulic pressure and recorded when the braking frictional pad is a brand new one, so as to determine the wear state of the braking frictional pad.

16. The method according to claim 15, wherein operation of the hydraulic brake devices of the other vehicle wheels of the motor vehicle is prohibited when the record module performs recording specific to the hydraulic brake device of one vehicle wheel of the motor vehicle.

17. The method according to claim 16, wherein the time required for establishing the brake hydraulic pressure and recorded by the record module is an average of time measured for the hydraulic brake device to establish the same brake hydraulic pressure.

18. The method according to claim 17, wherein the time required by the same hydraulic brake device for establishing the brake hydraulic pressure and recorded when the braking frictional pad is the brand new one is an average of time measured for the hydraulic brake device to establish the same brake hydraulic pressure.

19. The method according to claim 16, wherein recording the time required by the hydraulic brake device for establishing the brake hydraulic pressure is carried out after certain mileage of driving of the motor vehicle and when the motor vehicle is parked.

20. The method according to claim 15, wherein the motor vehicle comprises a brake fluid loop and a brake fluid tank in fluid communication with the brake fluid loop, the brake fluid loop comprises a hydraulic main pump and a fluid pipe network, and the fluid pipe network comprises a hydraulic loop part configured to enable one hydraulic brake device to be in fluid communication with the hydraulic main pump only when it is required to record a time required by said one hydraulic brake device for establishing the brake hydraulic pressure.

* * * * *